United States Patent [19]

Grossmann

[11] Patent Number: 5,031,490
[45] Date of Patent: Jul. 16, 1991

[54] PROCESS AND EQUIPMENT FOR LOADING AND UNLOADING THE MAIN WORK SPINDLE OF A LATHE

[75] Inventor: Walter Grossmann, Esslingen-Sulzgries, Fed. Rep. of Germany

[73] Assignee: Index-Werke Komm.-Ges. Hahn & Tessky, Esslingen, Fed. Rep. of Germany

[21] Appl. No.: 498,486

[22] Filed: Mar. 23, 1990

Related U.S. Application Data

[63] Continuation of Ser. No. 254,394, Oct. 5, 1988, abandoned.

[30] Foreign Application Priority Data

Oct. 14, 1987 [DE] Fed. Rep. of Germany ....... 3734687

[51] Int. Cl.[5] ............................................. B23B 15/00
[52] U.S. Cl. ........................................... 82/124; 29/36
[58] Field of Search .......................... 82/124, 129, 127; 29/36

[56] References Cited

U.S. PATENT DOCUMENTS 3,821,835 7/1974 Andre et al. ............................ 82/2.5
4,589,311 5/1986 Link et al. ................................. 82/3
4,612,832 9/1986 Ushigoe et al. ......................... 29/36

FOREIGN PATENT DOCUMENTS

3418893A1 11/1984 Fed. Rep. of Germany .
3420531C2 7/1986 Fed. Rep. of Germany .

Primary Examiner—Frederick R. Schmidt
Assistant Examiner—Jack Lavinder
Attorney, Agent, or Firm—Leydig, Voit & Mayer

[57] ABSTRACT

Process for loading and unloading the main spindle of a lathe which comprises a turret provided with at least two drivable auxiliary spindles and which is combined with a workpiece handling device, wherein in order to shorten the machining time, the rotating main spindle is loaded and unloaded with the aid of the auxiliary spindles driven at the same rotational speed as the main spindle, and the auxiliary spindles are loaded and unloaded by the workpiece handling device when they point in the upward direction.

16 Claims, 3 Drawing Sheets

PROCESS AND EQUIPMENT FOR LOADING AND UNLOADING THE MAIN WORK SPINDLE OF A LATHE

This is a continuation of application Ser. No. 254,394, filed on Oct. 5, 1988 which is now abandoned.

The invention relates to a process for loading and unloading the main work spindle of a lathe. The invention further relates to a lathe and to a device for carrying out such a process. In particular, the invention relates to the so-called magazine operation of a lathe.

In the magazine operation of a cam-controlled or program-controlled automatic lathe equipped with a turret, the raw parts to be machined are often fed via a magazine which—viewed from the front—is arranged on the right of the turret. The raw parts slide via a guide rail designed in dependence upon the workpieces into a movable tray or the like after first having been singled by means of a cylinder. In addition to a receiving tool which is likewise designed in dependence upon the workpieces and is arranged in one of its stations, the turret has an impact plate in another station, and the main work spindle is provided with a spring-loaded ejector by means of which a machined workpiece is ejected from the workpiece clamping device of the main work spindle after the clamping device has been opened. With the aid of the movable tray, a raw part to be machined is fed to the receiving tool of the turret by means of which the raw part is insertable into the clamping device of the main work spindle and the ejector is clamped at the same time. After the workpiece has been machined, it is ejected from the workpiece clamping device of the main work spindle, more specifically, against the impact plate arranged on the turret, by opening the workpiece clamping device of the main work spindle, and the workpiece falls into a likewise movable removal tray which carries it away out of the working area of the lathe. A disadvantage of this prior art is not only the expenditure for the magazine rail which has to be designed in dependence upon the workpieces, the singling cylinder and the receiving tool which is arranged on the turret and likewise has to be designed in dependence upon the workpieces, but also the fact that sensitive workpieces may incur damage when they are ejected against the impact plate and fall down into the removal tray and that the main work spindle must be stopped each time and then accelerated again when a raw part is to be inserted into the main spindle—this causes a considerable increase in the machining time. Finally, the machined workpieces are not guided out of the working area of the lathe with a specific orientation and so neither automatic measurement of the machined workpieces nor depositing of these in a pallet is possible (in pallets, the turned parts must be deposited upright and with a specific orientation) without provision of a further workpiece handling device.

It is, however, also known (U.S. Pat. No. 4,589,311) to take over a machined workpiece from the chuck of a main work spindle by means of a so-called synchronous spindle of a turret. Such a synchronous spindle is an auxiliary spindle which is rotatably mounted in a turret and drivable at the same speed as the main work spindle and which has a chuck or another workpiece clamping device at its outer end. Consequently, the main spindle can rotate while the machined workpiece is clamped in the synchronous spindle and then taken away out of the area of the main spindle by the synchronous spindle by the turret being indexed in the known method of operation through 180 degrees so that the workpiece is located on the side of the turret facing away from the main spindle.

Workpiece removing devices of portal-type design are also known. These comprise a slide guiding means which extends in the direction of the Z-axis, i.e., the main spindle axis and is arranged above the lathe. A hydraulically moved slide which is displaceable along the slide guiding means carries an arm which is pivotable about an axis parallel to the Z-axis and whose free end is provided with a removal tray or the like for receiving a workpiece. Apart from the fact that a workpiece which is collected with its axis in the horizontal position must be turned through 90 degrees when it is to be deposited in a pallet, a system comprised of the above-described known lathe and the above-described workpiece removing device would also have a further disadvantage: If the workpiece held in the synchronous spindle of the turret is also to be machined on its rear side at which it was clamped during the previous machining in the main spindle, this is expediently carried out by a rearward tool carrier which is arranged on the side of the turret facing away from the main spindle, as shown in the above-mentioned German Utility Model 83 13 200. However, there is then only little space available between the turret and the rearward tool carrier, i.e., the rearward tool carrier impedes the workpiece removing device.

The object underlying the invention is to provide a turning process and a lathe comprising a turret and combined with a workpiece handling device wherein also with temporary storage of the raw parts and the machined workpieces in magazines, on pallets or the like, there is no necessity for the main spindle to be stopped each time and accelerated again on taking over a raw part.

The basic concept underlying the invention is to use in a lathe with a turret comprising at least two workpiece holding devices, the latter and the indexable turret for handling the raw parts and the machined workpieces. The inventive process for loading and unloading a first workpiece clamping device of a main work spindle of a lathe which comprises a turret provided with at least a first and a second auxiliary spindle each having a second workpiece clamping device and which is combined with a workpiece handling device is characterized in that a first workpiece held by the main spindle is machined, a second workpiece to be machined is inserted into the clamping device of the stationary second auxiliary spindle by the handling device, the axis of the first auxiliary spindle is brought into alignment with that of the main work spindle and driven at the same rotational speed as the main work spindle, the first workpiece is removed from the main spindle by the first auxiliary spindle while the main spindle and the first auxiliary spindle rotate, the axis of the second auxiliary spindle is brought into alignment with that of the main spindle and driven at the same rotational speed as the main spindle, the second workpiece is transferred to the main spindle by the second auxiliary spindle while the main spindle and the second auxiliary spindle rotate, the second workpiece held by the main spindle is machined, the machined first workpiece is removed from the auxiliary spindle by the handling device while the auxiliary spindle is stationary, a third workpiece to be machined is transferred to one of the stationary auxiliary spindles by the handling device, the other auxiliary spindle is brought into alignment with the main spindle and driven at the same rotational speed as the main spindle and the machined second workpiece is removed from the main spindle by the other auxiliary spindle while the main spindle and the other auxiliary spindle rotate. In the continuation of this procedure, the third workpiece then becomes a second workpiece within the context of the above definition.

The inventive process does, of course, require a turret which is displaceable at least in the direction of the Z-axis in order to insert the raw parts into the clamping device of the main spindle and to remove the machined workpieces from it (the alternative, i.e., that the main spindle is movable in the direction of the Z-axis, is of no significance in practice).

Quite a number of advantages are to be gained with the inventive process: The main spindle does not have to be stopped and accelerated again in order to load it with a workpiece to be machined or to remove a machined workpiece from it, which considerably shortens the machining time. The workpieces to be machined may be transferred to the turret in almost any chosen position of the respective auxiliary spindle. In a corresponding manner, the machined workpieces may be removed from the turret in almost any chosen position of the respective auxiliary spindle—for space-related reasons, it is particularly advantageous for the auxiliary spindles to point upwardly when they are loaded or unloaded. Finally, the inventive process may readily be carried out in such a way that the workpieces to be machined and/or the machined workpieces are always taken over by the respective auxiliary spindle and transferred to the handling device with a specific orientation so that raw parts and machined workpieces can be temporarily stored in an upright position in pallets and the machined workpieces removed from the lathe can also be automatically measured. Finally, a rearward tool carrier arranged on the side of the turret facing away from the main spindle for machining the rear workpiece end previously held in the main spindle impedes neither the loading nor the unloading of the lathe as these steps may readily be carried out as long as the auxiliary spindles assume indexed positions in which they lie above the Z-axis. The fact that the auxiliary spindles must be stopped in order to take over and hand over a workpiece does not decrease in any way the gain in time achievable with the invention as the braking and accelerating again of the auxiliary spindles can readily be carried out while a workpiece held by the main spindle is being machined, possibly even during indexing of the turret.

In order that the machining times are affected to as slight an extent as possible by the indexing times of the turret, an embodiment of the inventive process is recommended in which the third workpiece to be machined is transferred to the second auxiliary spindle by the handling device although the first auxiliary spindle would also be free at this point in time. This has the advantage that the turret has to be indexed through a smaller angle in order to be able to take over a machined workpiece from the main spindle than if the raw part were inserted into the first auxiliary spindle—in the latter case, after the machined workpiece has been taken over, the turret would even have to be indexed back again in order to insert the raw part into the main spindle.

As is clear from the foregoing, provision of equipment to achieve the set object is based on a lathe which is combined with a workpiece handling device and which comprises a main spindle provided with a first workpiece clamping device and a tool carrier in the form of a turret having several stations. In at least two of its stations, the turret has one auxiliary spindle each which is provided with a second workpiece clamping device and is drivable at the same rotational speed as the main spindle. The turret is arranged on a slide displaceable in the direction of the main spindle axis (Z-axis) and is rotatable about an indexing axis in such a way that the auxiliary spindle axes may be brought into alignment with the main spindle axis. In accordance with the invention, such equipment is so constructed that the handling device is of portal-type design and comprises two workpiece grippers and that the two auxiliary spindles are arranged in two adjacent stations of the turret. With such equipment, it is possible to load the turret with workpieces to be machined from the top and to remove the machined workpieces at the top of the turret without losing much time for indexing the turret or for moving a workpiece gripper to a magazine, a pallet or the like. In principle, it is, of course, also conceivable to load and unload the turret with a portal-type handling device when the auxiliary spindles are not pointing upwardly, for example, in the case of a lathe without a rearward tool carrier or if there is enough space available below the turret—in this case, it is merely necessary for the workpiece gripper or a carrier for it to be appropriately designed.

In order to further shorten the machining times, it is expedient for the equipment to be so designed that not only the turret but also the workpiece grippers are displaceable in the direction of the Z-axis as it is then possible to already work with a tool of the turret while the handling device is inserting a workpiece to be machined into one of the auxiliary spindles and/or is removing a machined workpiece from one of the auxiliary spindles for it is then possible for the workpiece grippers to be displaced parallel to the Z-axis just as quickly as the turret. For such a mode of operation, an embodiment in which coupling means and/or stop means effective in the direction of the Z-axis are provided on the handling device and on the slide carrying the turret is particularly recommendable as no numerically controlled drive is then required for the workpiece grippers.

In order to push one of the workpiece grippers onto the workpiece to be gripped without the workpiece gripper having to be moved in the direction of the respective auxiliary spindle axis when it is standing over the workpiece to be gripped, in a particularly advantageous embodiment, each of the workpiece grippers forms in the open state on its side facing the main spindle in the working position an opening for the workpiece so that it can be pushed onto the workpiece in the direction of the Z-axis.

Further features, advantages and details of the invention are to be found in the enclosed claims and/or the following description and the appended drawings of a particularly advantageous embodiment of the inventive equipment. The drawings show:

The part of the front view of the lathe illustrated in the drawings shows a headstock 10 at the left and a machine bed 12 at the bottom. A guide bar 14 extending in the direction of the Z-axis 16 of the lathe is mounted on the machine bed 12. The Z-axis coincides with the axis of a main spindle 18 which is rotatably supported in the headstock 10. At the front, the main spindle 18 has a chuck 20 which is the first workpiece clamping device within the context of the claims. A drive for the main spindle 18 is not illustrated.

The machine bed 12 carries a slide 30 which is slidably guided by means of the guide bar 14 in the direction of the Z-axis 16. A drive, not illustrated, controls displacement of the slide 30. A turret 32 is supported on this slide for rotation about an indexing axis 34 extending horizontally and perpendicularly to the Z-axis 16 (the indexing axis 34, therefore, extends in the direction of the so-called X-axis of the lathe).

Means for controlled rotation or indexing and correct rotary angular positioning of the turret 32 are known and, consequently, not illustrated. The illustrated turret has 8 stations, two of which are equipped with so-called synchronous spindles $36^1$ and $36^2$, whereas the remaining stations are equipped with tools 40 held by tool holders 38. It is particularly expedient to arrange the first synchronous spindle $36^1$ located at the front in the indexing direction (counterclockwise direction) of the turret 32 and the second synchronous spindle $36^2$ in immediately adjacent stations of the turret. The axes about which the synchronous spindles $36^1$ and $36^2$ are rotatably supported in the turret 32 and about which they are driven by known means, not illustrated, are designated 42. In accordance with the invention, the turret 32 is so designed, the indexing axis 34 so arranged and each of the synchronous spindles so supported in the turret 32 that the axes of rotation 42 of the synchronous spindles $36^1$ and $36^2$ can be brought into alignment with the Z-axis 16 and hence with the axis of rotation of the main spindle 18 when the turret 32 assumes its indexed position shown in FIGS. 1 and 2, respectively, in which the axis of rotation 42 of the synchronous spindle $36^1$ and the synchronous spindle $36^2$, respectively, extends horizontally.

In accordance with the invention, a stop 44 whose purpose will be explained below, is arranged on the slide 30. In principle, a stop which is attached to the turret 32 could be arranged beside each of the synchronous spindles $36^1$ and $36^2$.

Figure 3:
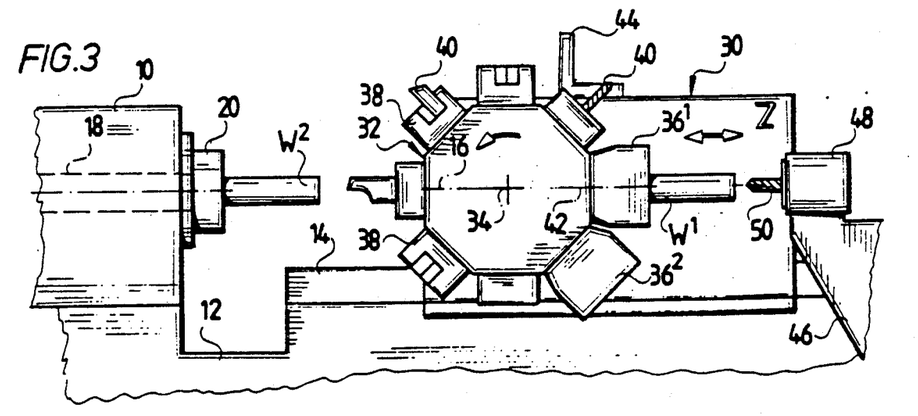
FIG. 3 the same parts as in FIGS. 1 and 2 after the turret has been indexed through 180 degrees in relation to the position shown in FIG. 1 to enable the first workpiece to be machined by a tool of a rearward tool carrier.

Finally, a console 46 is secured to the machine bed 12. A tool carrier 48 is arranged on the console 46. The tool carrier 48 may be attached to the console 46—in this case, it is then equipped with a single tool 50 only—or the tool carrier 48 may be displaceable perpendicularly to the drawing plane of FIG. 1 and then carry several tools 50 each of which can be positioned in such a way that a workpiece held by a synchronous spindle can be machined by it, as shown in FIG. 3—in this case, the axis of the drill 50 illustrated therein is in alignment with the axis of rotation 42 of the synchronous spindle $36^1$. Finally, it is possible to place the turret 32 on a compound slide system so that it is displaceable not only in the direction of the Z-axis 16 but also in the direction of the X-axis of the lathe and to equip the rearward tool carrier 48 with several tools 50 although it is stationary.

A workpiece handling device according to the invention comprises a portal formed by guide rails 52 extending parallel to the Z-axis 16, a slide 54 displaceable along the guide rails, a carrier 56 guided on slide 54 for displacement parallel to the Z-axis 16, a further slide 57 guided on carrier 56 for displacement in the vertical direction and a workpiece double gripper 58 pivotably held on slide 57. The pivot axis of the double gripper 58 extending in the direction of the X-axis is designated 59. The double gripper 58 has two specially designed collets 60 which will be explained below. Drives for the slides 54 and 57 and for the double gripper 58 and likewise actuating means for the collets 60 have not been illustrated as these are elements which are known in machine tool design. However, in accordance with the invention, an energy accumulator, illustrated here as spring 62, acting in the direction of the Z-axis 16, is located between the slide 54 and the carrier 56.

Figure 6:
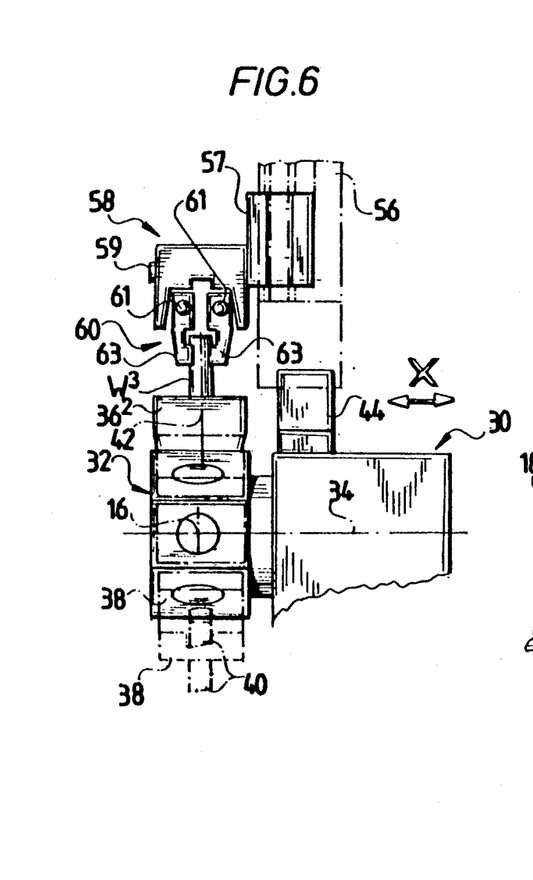
FIG. 6 a view of the one workpiece gripper and part of the turret, viewed in the direction of arrow "A" of FIG. 5.

As shown in FIG. 6, each of the collets 60 is designed in accordance with the invention such that when open and facing the turret 32, it can be driven in the direction of the Z-axis 16, more specifically, in the direction towards the headstock 10, over a workpiece held vertically upwardly by one of the synchronous spindles $36^1$, $36^2$, without it being necessary to lower the slide 57 whenever the respective collet 60 is standing over the workpiece. For this purpose, the collets are designed, in accordance with the invention, such that an open collet facing the turret 32 forms at least in accordance with FIG. 6 at the rear a sufficiently large opening to enable it to be driven over the workpiece.

The mode of operation according to the invention will now be explained with reference to FIGS. 1 to 6.

Figure 1:
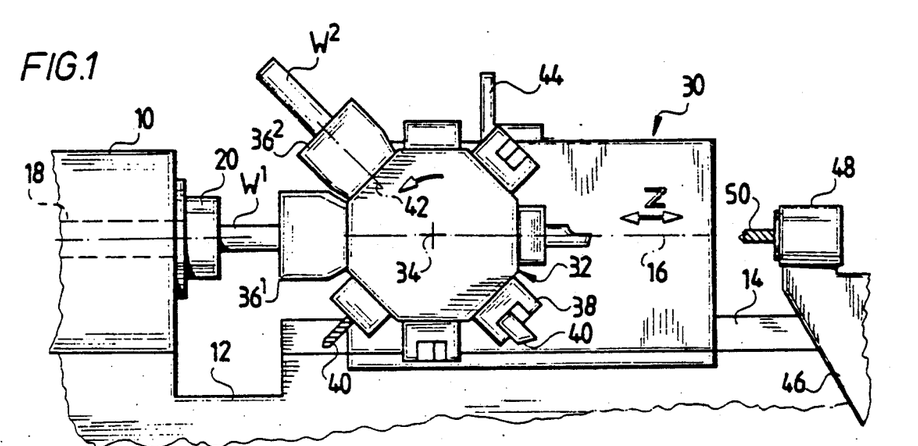
FIG. 1 part of the front view of the lathe of this equipment where the workpiece handling device has been omitted for reasons of simplicity as the workpiece handling device does not participate in the procedural step illustrated in FIG. 1 which shows the first synchronous spindle of the turret of the lathe taking over a machined first workpiece.
Figure 2:
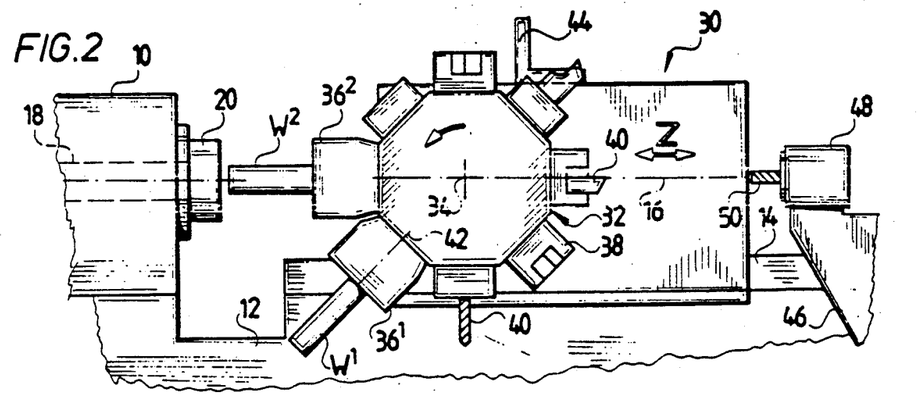
FIG. 2 the same parts as in FIG. 1 after the turret has been indexed one station and is about to transfer a second workpiece to be machined to the main spindle of the lathe.

After a first workpiece $W^1$, held by the main spindle 18 has been machined by tools 40 of turret 32 and/or the tools of another tool carrier, not illustrated, and the synchronous spindle $36^1$ has been brought into alignment with the main spindle 18, as illustrated in FIG. 1, the chuck, not illustrated in detail, of synchronous spindle $36^1$ is driven in the open state over the workpiece $W^1$ and its right end, in accordance with FIG. 1, is clamped in synchronous spindle $36^1$ while both spindles 18 and $36^1$ rotate at the same speed. The chuck 20 is then opened, the slide 30 driven to the right, in accordance with FIG. 1, and turret 32 indexed one station in the counterclockwise direction so it assumes the position shown in FIG. 2 enabling it to transfer a second workpiece $W^2$ to be machined and held by the second synchronous spindle $36^2$ to the main spindle 18. During the entire time, the main spindle 18 can rotate, and at the latest at the time of transferral of the workpiece $W^2$ to the main spindle, the synchronous spindle $36^2$ must be driven at the same speed as the main spindle.

After transferral of the second workpiece $W^2$ to the main spindle 18, the turret 32 can be indexed as shown in FIG. 3.

This indexing of the turret 32 may, however, take place in the course of machining workpiece $W^2$ with tools 40 of turret 32, assuming that these tools are used one after the other. When the first synchronous spindle $36^1$ is then facing the rearward tool carrier 48, the end of workpiece $W^1$ previously located in chuck 20 of main spindle 18 can be machined by the tools 50 of tool carrier 48 while the second workpiece $W^2$ is machined with tools of another tool carrier, not illustrated, of, for example, a second turret arranged on a compound slide system.

Subsequently, possibly in the course of the further machining of the second workpiece $W^2$ by tools 40 of turret 32, the latter is indexed until the first workpiece $W^1$ points upwardly (cf. FIG. 4). The workpiece handling device now becomes operative. Its collets 60 are advantageously designed in the manner shown in FIG. 6—each of these collets has two gripping jaws 63 pivotable about axes 61. The gripping jaws 63 can be pivoted outwardly away from each other out of the position shown in FIG. 6 in order to open the respective collet.

Figure 4:
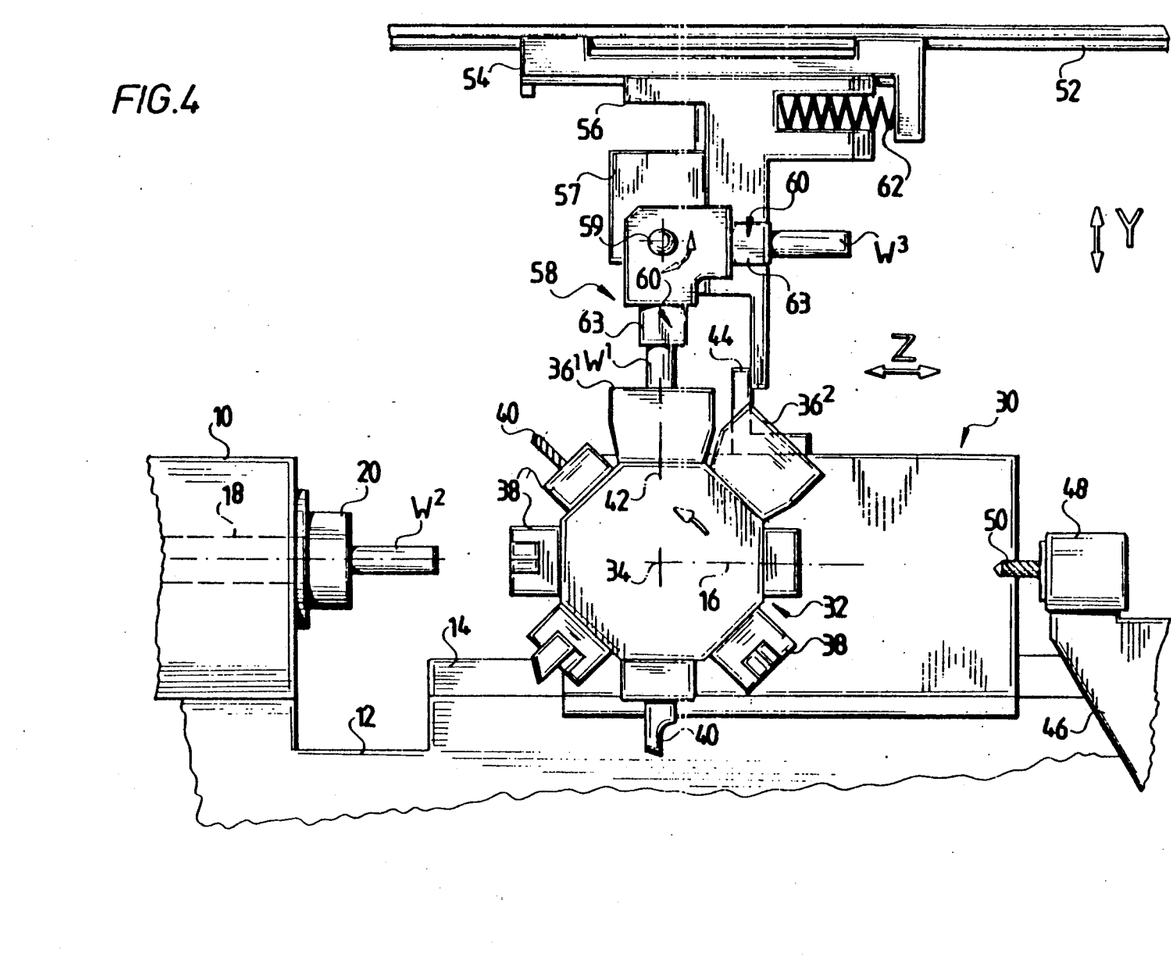
FIG. 4 the lathe and the main components of the workpiece handling device of portal design after the turret has been indexed through 270 degrees in relation to the position shown in FIG. 1 and the handling device is about to take over the first workpiece.

When the finished first workpiece $W^1$ points upwardly, as shown in FIG. 4, the slide 54 is driven from the right to the left over the turret 32 until the carrier 56 rests against the stop 44 and the spring 62 is tensioned (the maximum spring tension is reached when the carrier 56 rests against the right-hand abutment of spring 62 formed by slide 54). The workpiece double gripper 58 may thereby assume its vertical position shown in FIG. 4 whenever the downwardly pointing collet 60 is open for the latter can then be pushed over the finished workpiece $W^1$ carried by synchronous spindle $36^1$, and it is 1 not necessary to lower double gripper 58 whenever it is located over the workpiece. This results in a further shortening of the machining time. The next workpiece $W^2$ can then already be machined by a tool 40 of the turret 32 while the chuck of the synchronous spindle $36^1$ is opened to release the workpiece $W^1$, and the double gripper 58 is raised in order to pull the workpiece out of the synchronous spindle. This requires no controlled motion of the slide 54 since the spring 62 automatically causes the carrier 56 to follow, and the stop 44 ensures that the double gripper 58 does not move in the direction of the Z-axis in relation to the synchronous spindle $36^1$. This also results in a further shortening of the machining time.

Figure 5:
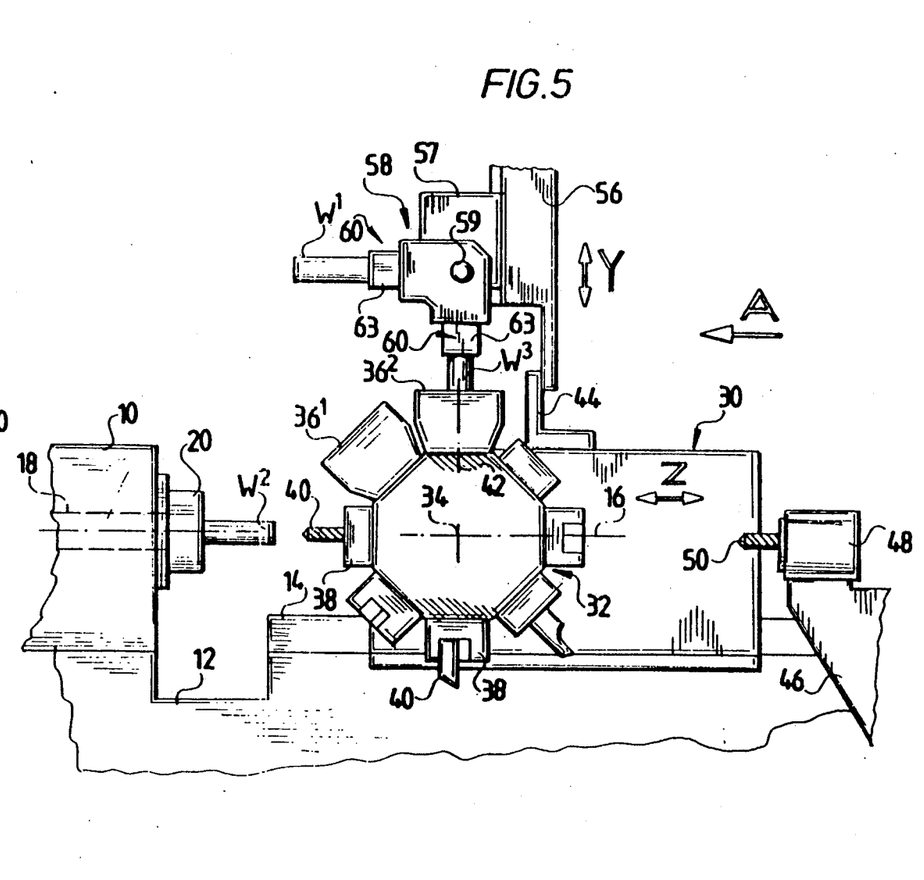
FIG. 5 the same parts as in FIG. 4 after the turret has been indexed one station and the handling device is about to transfer a third workpiece to be machined to the turret.

Once the workpiece double gripper 58 has gripped and raised the first workpiece $W^1$ to the extent that it can be pivoted through 90 degrees in the clockwise direction about a pivot axis 59, the next workpiece $W^3$ to be machined is standing over the turret 32 which has meanwhile been indexed one station so the second synchronous spindle $36^2$ points upwardly. The double gripper 58 is then lowered so the workpiece $W^3$ introduced into the open chuck, not illustrated, of synchronous spindle $36^2$. After the workpiece $W^3$ has been clamped in the chuck of the second synchronous spindle $36^2$, the downwardly pointing collet 60 of the double gripper 58 is opened so that 2 after indexing of the turret 32, the workpiece $W^2$ can be taken over by the synchronous spindle $36^1$ and after a further indexing step of the turret, the third workpiece $W^3$ can be transferred to the main spindle 18.

Meanwhile the slide 54 has been driven rightwardly out of the working area of the lathe in order to grip a new raw part with the downwardly pointing collet 60 and to deposit the finished workpiece $W^1$ in a pallet or the like after double gripper 58 has pivoted through 90 degrees in the counterclockwise direction. Once the workpiece $W^2$ has been taken over by the synchronous spindle 36, the workpiece $W^3$ has been transferred to the main spindle 18 and the turret has been indexed so far that the workpiece $W^2$ points upwardly, the workpiece handling the working then moves into the working area of the lathe again in order to take over the workpiece $W^2$ with the free collet 60.

If the double gripper 58 can only be moved in the direction of the Z-axis (aside from the vertical motion, i.e., the motion in the direction of the so-called Y-axis) and the workpieces are to be temporarily stored in pallets, it is, of course, necessary for these pallets to be displaceable in a clocked manner in the direction of the X-axis.

It is also within the scope of the invention for the carrier 56 to be connectable with the turret or its slide at least in the direction of the Z-axis by releasable connecting means.

Also, another suitable workpiece holding device may be used instead of a synchronous spindle for feeding and/or removing the workpieces. This device need only fulfill two requirements: Firstly, a rotating workpiece must be able to be held in it and, secondly, it must comprise means for preventing the workpiece from falling out when the turret rotates. The workpiece holding device may, for example, have the shape of a tube or sleeve which is attached to the turret and in which a workpiece can rotate, but which is prevented from falling out by a locking bar or a clamping device at the latest when the turret is indexed. It is more expedient for the sleeve or a shaft which is provided with a workpiece clamping device to be rotatably supported in the turret without a rotary drive being provided for the sleeve or shaft. However, a workpiece holding device which can be driven at the same rotational speed as the main spindle is preferred at least for transferral of a workpiece to be machined to the rotating main spindle.

The fact that the inventive lathe can be used with advantage in accordance with the inventive process is also to be regarded as an aspect of the invention.

The present disclosure relates to the subject matter disclosed in German application No. P 37 34 687.3-14 of Oct. 14, 1987, the entire specification of which is incorporated herein by reference.

What is claimed is:

1. A method of processing workpieces in a machine tool unit comprising a workpiece handling device and a lathe which has a rotating main work spindle with a workpiece clamping device and a turret rotatable about an indexing axis with at least first and second rotatable workpiece holding devices each with a workpiece clamping device which can be driven in synchronism with the main spindle, said method comprising the steps of:

(a) machining a first workpiece held by the workpiece clamping device of the main spindle;

(b) loading a second workpiece to be machined into the second workpiece holding device using the handling device;

(c) indexing the turret to bring the first workpiece holding device into alignment with the rotating main spindle;

(d) transferring the machined first workpieces to the first workpiece holding device while both the first workpiece holding device and the main spindle rotate by causing the workpiece clamping device of the first workpiece holding device to simultaneously clamp the first workpiece and then causing the workpiece clamping device of the main spindle to release the first workpiece such that the first workpieces is transferred;

(e) indexing the turret to bring the second workpiece holding device with the second workpiece into alignment with the rotating main spindle;

(f) transferring the second workpiece to the workpiece clamping device of the main spindle while both the second workpiece holding device and the main spindle rotates by causing the workpiece clamping device of the main spindle to simultaneously clamp the second workpiece and then causing the workpiece clamping device of the second workpiece holding device to release the second workpiece such that the second workpiece is transferred;

(g) indexing the turret to align the first workpiece holding device with the handling device;

(h) machining the second workpiece;

(i) removing said machined first workpiece from the first workpiece holding device using the handling device;

(j) loading a third workpiece to be machined into one of the workpiece holding devices using the handling device, while leaving the other workpiece holding device unloaded;

(k) indexing the turret to bring the unloaded workpiece holding device into alignment with the main spindle; and (l) transferring the machined second workpiece to the unloaded workpiece holding device while both the unloaded workpiece holding device and the main spindle rotate by causing the workpiece clamping device of the unloaded workpiece holding device to simultaneously clamp the second workpiece and then causing the workpiece clamping device of the main spindle to release the second workpiece such that the second workpiece is transferred.

2. The method of claim 1 wherein the handling device is moved parallel to the main spindle axis and in synchronism with the turret such that steps (h) and (i) occur simultaneously.

3. The method of claim 1 wherein the handling device is moved parallel to the main spindle axis and in synchronism with the turret such that steps (h) and (j) occur simultaneously.

4. The method of claim 1 wherein removal of a machined workpiece from a workpiece holding device which has been related about its indexing axis into alignment with the handling device is accomplished with no required additional movement of the turret by:
moving the handling device toward the workpiece holding device so that a gripper may grasp onto the workpiece; and
releasing the workpiece from the workpiece holding device.

5. The method of claim 1 wherein loading of a workpiece to be machined into a workpiece holding device which has been rotated about is indexing axis into alignment with the handling device is accomplished with no required additional movement of the turret by:
moving the handling device toward the workpiece holding device so that the workpiece holding device may grasp onto the workpiece; and
releasing the workpiece from the handling device.

6. A method of processing workpieces in a machine tool unit comprising a workpiece handling device and a lathe which has a rotating main work spindle with a workpiece clamping device and a turret rotatable about an indexing axis with at least first and second rotatable workpiece holding devices each with workpiece clamping devices which can be driven in synchronism with the main spindle, said method comprising the steps of:

(a) machining workpieces held by the workpiece clamping device of the main spindle;

(b) transferring machined and unmachined workpieces between the workpiece handling device and the workpiece holding devices; and (c) transferring workpieces between a workpiece holding device and the main spindle while the main spindle rotates by:
(1) driving the workpiece holding device at a rotational speed equal to that of the main spindle;
(2) positioning the turret so that the workpiece clamping device of the main spindle and the workpiece holding device are axially aligned, with one of said aligned workpiece clamping devices grasping onto the workpiece and the other of said aligned workpiece clamping devices not grasping the workpiece;
(3) causing the other aligned workpiece clamping device to simultaneously grasp the workpiece; and
(4) releasing the workpiece from the aligned workpiece clamping device which initially grasped the workpiece whereby the workpiece is transferred.

7. The method of claim 6 which further comprises the turret rotating about is indexing to align a workpiece holding device carrying a machined workpiece with a gripper of the handling device and removing said machined workpiece from said workpiece holding device using the handling device with no required additional movement of the turret by:
moving the handling device toward the workpiece holding device so that a gripper may grasp onto the workpiece; and
releasing the workpiece from the workpiece holding device.

8. The method of claim 6 which further comprises the turret rotating about its indexing axis to align an empty workpiece holding device with a gripper of the handling device carrying a workpiece to be machined and loading said workpiece to be machined into said workpiece holding device using the handling device with no required additional movement of the turret by:
moving the handling device toward the workpiece holding device so that the workpiece holding device may grasp onto the workpiece; and
releasing the workpiece from the handling device.

9. A lathe for processing workpieces, comprising:
a main spindle having a workpiece clamping device for grasping a workpiece during machining thereof, said main spindle being rotatable about a main spindle axis;
a tool turret having a plurality of stations with at least two adjacent stations comprising first and second rotatable workpiece holding devices which can be selectively driven in synchronism with the main spindle, said turret being arranged on a slide which is displaceable parallel to the main spindle axis and being rotatable about an indexing axis such that the workpiece holding devices may be aligned with the main spindle axis; and a workpiece handling device having at least two workpiece grippers, said handling device comprising means for transferring a machined workpiece from one of the workpiece holding devices to the handling device and for transferring a workpiece to be machined from the handling device to one of the workpiece holding devices while the axis of one of the stations of the turret is aligned with the main spindle axis.

10. The lathe of claim 9 wherein said handling device is of portal design.

11. The lathe of claim 9 wherein said two workpiece grippers comprise a double gripper.

12. The lathe of claim 11 wherein said double gripper is pivotally mounted on a carrier such that said two workpiece grippers may be alternatively moved into alignment with a workpiece holding device of said turret.

13. The lathe of claim 9 wherein said workpiece grippers as displaceable parallel to the main spindle axis.

14. The lathe of claim 9 wherein said workpiece grippers are slidably mounted for displacement toward and away from said turret.

15. The lathe of claim 9 wherein stops are provided on the handling device and the turret slide, said stops being effective in the direction of the main spindle axis.

16. The lathe of claim 9 which further comprises means for causing at least a portion of the handling devices to travel in the direction of the main spindle axis in synchronism with any movement of the turret in the direction of the main spindle axis.

* * * * *

UNITED STATES PATENT AND TRADEMARK OFFICE
CERTIFICATE OF CORRECTION

PATENT NO. : 5,031,490
DATED : July 16, 1991
INVENTOR(S) : Walter Grossman

It is certified that error appears in the above-indentified patent and that said Letters Patent is hereby corrected as shown below:

Col. 7, line 39, delete the number "1".

line 60, insert after "$W^3$" insert --is--.

line 65, delete the number "2".

line 66, after "the" insert --first--.

Col. 8, line 13, delete "the working" and insert --device--.

Col. 9, line 4, change "workpieces" to --workpiece--.

line 12, change "workpieces" to --workpiece--.

line 19, change "rotates" to --rotate--.

line 58, change "related" to --rotated--.

line 68, change "is" to --its--.

UNITED STATES PATENT AND TRADEMARK OFFICE
CERTIFICATE OF CORRECTION

PATENT NO. : 5,031,490

DATED : July 16, 1991

INVENTOR(S) : Walter Grossman

It is certified that error appears in the above-indentified patent and that said Letters Patent is hereby corrected as shown below:

Col. 10, line 25, after "and the" insert --workpiece clamping device of the-- lines 39-40, "the turret rotating about is indexing to align" should read --rotating the turret about its indexing axis to align--.

lines 51-52, "the turret rotating" should read --rotating the turret--.

Col. 12, line 16, change "devices" to --device--.

Signed and Sealed this

Twenty-sixth Day of October, 1993

Attest:

BRUCE LEHMAN

*Attesting Officer*    *Commissioner of Patents and Trademarks*